June 14, 1927.
G. F. MUEHLHAUSE
1,632,345
PLOW
Filed March 15. 1926
2 Sheets-Sheet 2
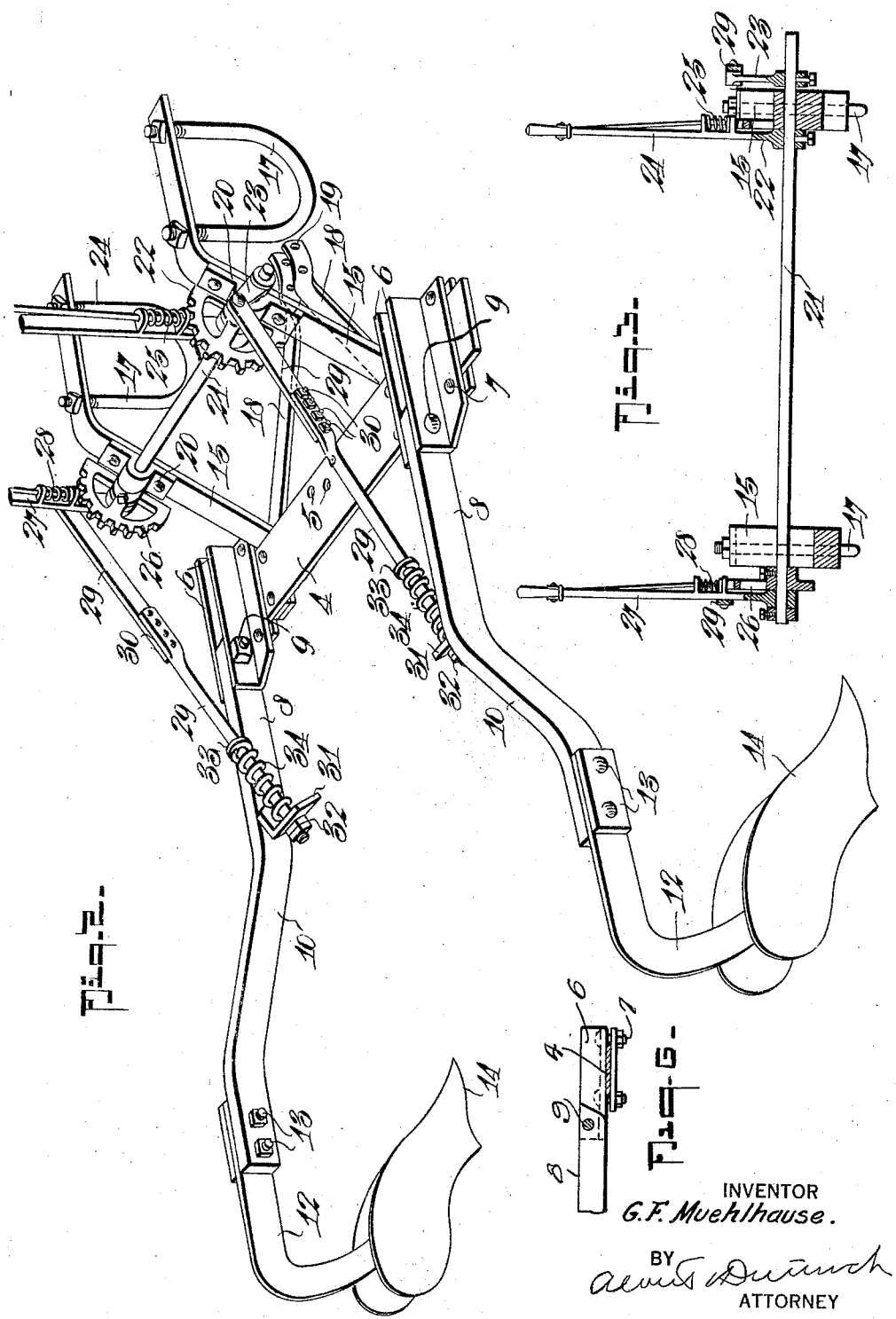
INVENTOR
G.F. Muehlhause.
BY
ATTORNEY Patented June 14, 1927.

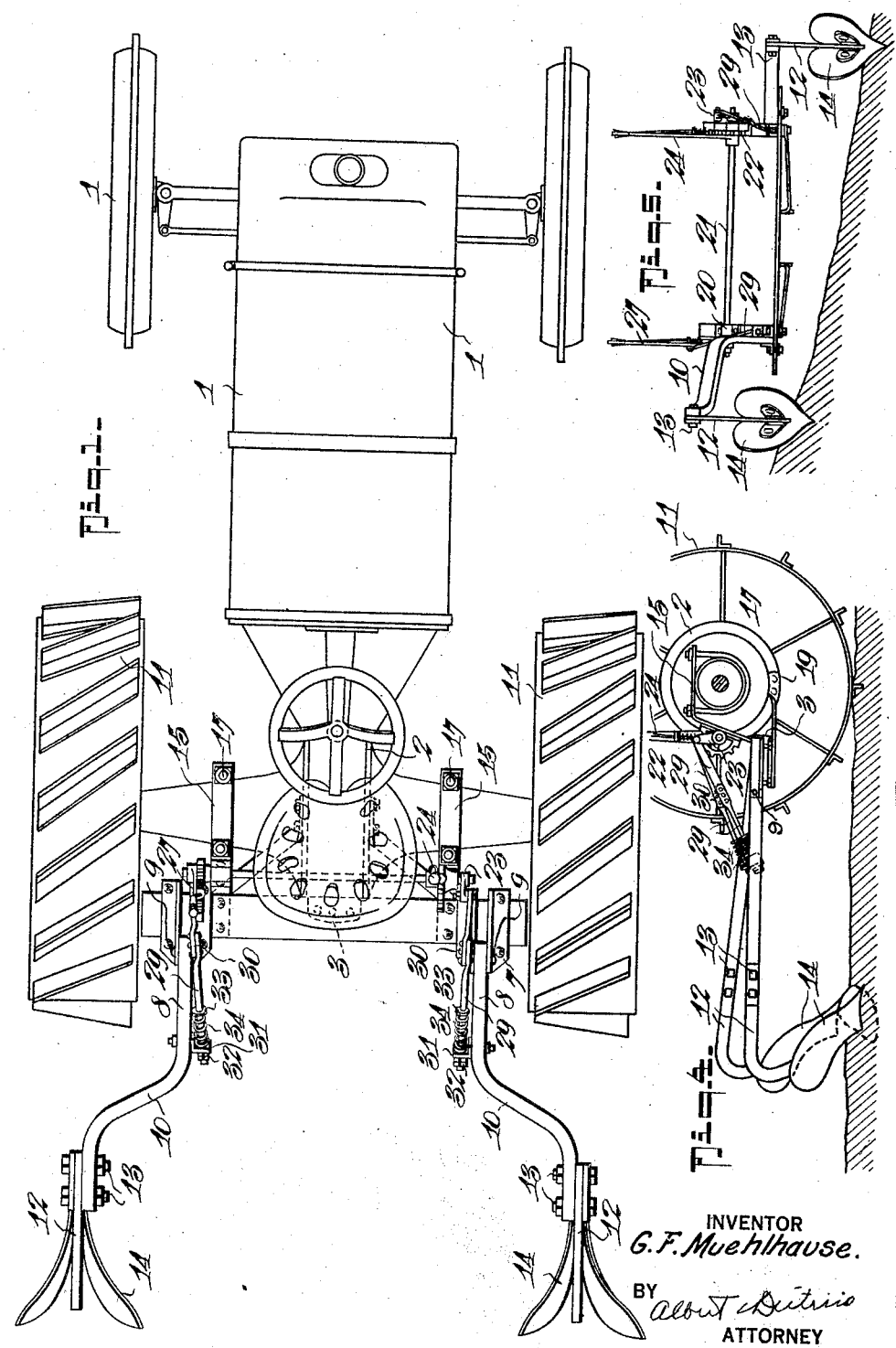

1,632,345

UNITED STATES PATENT OFFICE.

GERHART F. MUEHLHAUSE, OF BARTLETT, TEXAS.

PLOW.

Application filed March 15, 1926. Serial No. 94,919.

The invention generally relates to plows and more particularly to those of the gang type adapted for being drawn by tractors or the like.

In its more specific nature the invention seeks to provide a simple and efficient plow of the type stated wherein is provided means for rigidly securing the same to a tractor to be drawn thereby, carrying arms for carrying the plow-heads and shaped for avoiding the tractor wheels, and positioning said plow-heads in the paths of travel of said wheels, means for pivoting the carrying arms at their front ends and means for adjusting the relation of the plow-heads with the ground individually or collectively.

The invention further resides in the provision, as a part of the ground and plow head relation adjusting devices, of yieldable connections for permitting lifting of the plow heads upon contact with fixed abutments while being drawn along the ground.

With the above and other objects in view that will hereinafter appear, the invention further resides in the novel details of construction, combination and arrangement of parts, all of which will be first fully described, then be particularly pointed out in the appended claims, reference being had to the accompanying drawings, in which:

Figure 1 is a somewhat diagrammatic plan view of the invention attached to a tractor.

Figure 2 is a perspective view of the invention.

Figure 3 is a vertical cross section taken across the securing framing at the position of the rockable cross shaft.

Figure 4 is a diagrammatic longitudinal section illustrating the yieldable feature of the plow-head mounting.

Figure 5 is a diagrammatic rear elevation illustrating one purpose of the individual depth adjustments for the plow head carrying arms.

Figure 6 is a detail cross section illustrating the pivoted connection of one of the carrying arms with the draw bar.

In the drawings, in which like numerals of reference indicate like parts in all of the figures, 1 generally indicates a tractor. The rear transmission housing of the tractor is indicated at 2 and 3 indicates the draw bar connecting bracket.

In carrying out the invention I provide a draw bar 4 which is in the nature of a transverse flat beam having a plurality of apertures 5 in the center thereof to facilitate the securing of the said bar to the bracket 3 of the tractor.

A pair of angled cleats 6 are secured as at 7 to each end of the bar in opposed relation.

A pair of plow-head carrying arms 8 are provided and have their front ends inserted between the opposed cleats 6 to which they are pivoted as at 9, the said arms being bent outwardly as at 10 to clear the wheels and to center the path of travel of each plow-head in alignment with the line of travel of the rear tractor wheels 11 in the manner illustrated in Figure 1 of the drawings.

The front ends of the plow beams 12 are secured as at 13 to the rear ends of the carrying arms 8 and the said plow beams each carry a plow-head 14 of any desired shape for accomplishing its intended purposes.

A pair of upper brace bars 15 are provided, one thereof being secured as at 16 to each end of the draw bar 3 and adapted to project forwardly upwardly therefrom so that their projected ends may be securely clamped to the transmission housing 2 of the tractor, U-clamps 17 being provided at each bar end for this purpose.

A pair of lower brace bars 18 are also provided and are likewise secured as at 16 to the draw bar and said lower braces extend forwardly downwardly and in an angular direction for being secured as at 19 to the central enlargement of the said transmission housing 2.

A bearing member 20 is secured upon each brace bar 15 and the said bearings are adapted to receive the cross rod 21 which is preferably square and is rockably mounted in the said bearings for a purpose later to be described. A notched quadrant 22 is secured on one of the brace bars 15, the notched edge thereof being concentric to the axis of the adjacent bearing 20. An operating arm 23 is secured upon the rod 21 to oscillate with the end of the rod which projects through the quadrant 22 and the adjacent bearing 20 and a main operating lever 24 is also secured upon the end of the rod 21 in position for having the spring pawl 25 thereof coact with the notches of the quadrant 22 so that the rod 21 may be rocked in its bearings to vary the angular position of the operating arm 23 and to secure the rod to a selected adjustment.

Another notched quadrant 26 is provided and is secured upon to rock with the opposite end of the cross rod 21, a second operating arm 27 being provided and loosely mounted upon the end of the rod 211 adjacent the quadrant 26 and having spring pawl equipment 28 for cooperating with the notches of the said last named quadrant. By reason of the loose mounting of the arm 27 and the quadrant and spring pawl devices the angular relation of the said arm may be adjusted independently of any movement of the cross rod 21 for a purpose later to be described.

Penetration limiting rods 29 are provided, one thereof having its front end connected to each of the operating arms 23 and 27 and each of which is equipped as at 30 to render positive the adjustment of the length thereof as may be desired.

The rear ends of the rods 29 pass freely through angled brackets 31 secured to the carrying arms 8 in the manner and in the position indicated in the drawings and the said rod ends are equipped with stop and jamb nuts 32 for engaging the rear faces of the brackets 31 to limit downward movement of the carrying arms on their pivotal connections 9, thus limiting the degree of penetration of the plow-heads.

By providing the rockable shaft and lever connections the cross shaft 21 may be rocked and the angle of the operating arms 23 and 27 varied to adjust the degree of penetration of the plow-heads by changing the points at which the stop nuts 32 will engage the brackets 31. Also by reason of providing the adjustable operating lever and quadrant connections 27 and 26 the plow-head at that particular side of the plow may be individually adjusted in addition to the quadrant adjustment feature, thus making it possible to individually or collectively adjust the depth of penetration of the plow-heads. An abutment collar 33 is secured upon each rod 29 a considerable distance from the ends thereof to act as stop collars for the ends of the springs 34 which are interposed one on each of the rods between the said collar thereof and the bracket 31 through which the rod passes. In this manner, while downward movement of the arms 8 on their pivots 9 is prevented beyond the limit set by the nuts 32, upward movement of the said arms on their pivots is permitted in opposition to the spring action.

In this manner should one of the plow-heads come into contact with a fixed abutment while being drawn through the ground the same would be permitted to lift or ride over the obstruction against the pressure of the respective spring 34 which springs tend to force the plow-heads into the ground.

In the foregoing description I have disclosed a plow of the type stated which is of a particularly simple construction, readily mountable upon a tractor for being drawn along the ground thereby and in which means is provided for independently or collectively adjusting the limit of penetration of the plows for adapting them for use on uneven ground or on hill sides and for permitting an upward yielding or lifting of the plow on coming in contact with a fixed abutment while being drawn along the ground.

From the foregoing description, taken in connection with the accompanying drawings, it is thought that the novel details of construction, manner of operation and the advantages of my invention will be readily apparent to those skilled in the art to which it relates.

What I claim is:

1. A device of the class described comprising a flat draw bar adapted to be secured at its center to the draft lug of a tractor, a pair of upper bracket arms secured to and projecting forwardly upwardly from the draw bar and having provision at their ends for securing them to the rear axle housing of a tractor adjacent the ends thereof, a pair of lower bracket arms secured to and projecting downwardly forwardly and inwardly and terminating in opposed apertured ears adapted to be secured to the side faces of the rear axle central gearing housing beneath the axle and by the bolts commonly employed to secure the said housing parts together, and cultivator elements mounted on the draw bar.

2. A device of the class described comprising a flat draw bar adapted to be secured at its center to the draft lug of a tractor, a pair of upper bracket arms secured to and projecting forwardly upwardly from the draw bar and having provision at their ends for securing them to the rear axle housing of a tractor adjacent the ends thereof, a pair of lower bracket arms secured to and projecting downwardly forwardly and inwardly and terminating in opposed apertured ears adapted to be secured to the side faces of the rear axle central gearing housing beneath the axle and by the bolts commonly employed to secure the said housing parts together, spaced angles mounted upon the draw bar at its respective ends and having rearwardly projecting portions, cultivator members pivoted between the projecting portions of the angles, and means for adjustably securing the spaced angles upon the said draw bar ends.

3. A device of the class described comprising a flat draw bar adapted to be secured at its center to the draft lug of a tractor, a pair of upper bracket arms secured to and projecting forwardly upwardly from the draw bar and having provisions at their ends for securing them to the rear axle housing of a tractor adjacent the ends thereof, a pair of lower bracket arms secured to and projecting downwardly forwardly and inwardly and terminating in opposed apertured ears adapted to be secured to the side faces of the rear axle central gearing housing beneath the axle and by the bolts commonly employed to secure the said housing parts together, spaced angles mounted upon the draw bar at its respective ends and having rearwardly projecting portions, a cultivator carrying arm pivoted at its advance end between the extended portions of the angles at each draw bar end, a cross shaft rotatable in bearings secured to the upwardly forwardly extended portions of the upper bracket arms, a crank arm secured upon the shaft at one end, a second crank arm angularly adjustably mounted on the other end of the shaft, a notched quadrant secured to one upper bracket arm adjacent one end of the cross shaft, an adjusting lever secured on the cross shaft and having a spring pawl to engage said quadrant, an apertured bracket on each cultivator carrying arm, an adjusting rod connected to each crank arm, the free end of each of which is passed through the aperture of the cultivator carrying arm bracket and equipped with a stop head, and a spring device on each adjusting rod for engaging the rod and the respective bracket to tend to force the respective carrying arm downwardly while permitting a degree of forced upward movement against that tendency when necessary.

GERHART F. MUEHLHAUSE.